UNITED STATES PATENT OFFICE 2,424,921

THIOCARBAMYL SULFENAMIDES

George E. P. Smith, Jr., and Edward L. Carr, Akron, Ohio, assignors to The Firestone Tire & Rubber Company, a corporation of Ohio No Drawing. Original application May 26, 1943, Serial No. 488,556. Divided and this application April 16, 1945, Serial No. 588,714

4 Claims. (Cl. 260—551)

This invention relates to a new class of chemical compounds which are valuable accelerators of the vulcanization of rubber or rubber-like substances. This specification is a division of our copending application Serial No. 488,556, filed May 26, 1943, now Patent Number 2,381,392.

It is a primary object of the present invention to provide a new class of chemical compounds, and a method of making the same.

Another object is to provide a new class of improved rubber vulcanization accelerators of the delayed-action, non-scorching ultra-accelerator type.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of a dithiocarbamate and an amine. The preferred compounds of the invention may be prepared by treating an alkaline aqueous mixture of a dithiocarbamate and a primary alkyl amine or a primary cyclo-alkyl amine with one of the following oxidizing agents: chlorine, bromine, iodine, hypochlorous acid, hypobromous acid, hypoidous acid and alkali metal and alkaline earth metal salts of said acids. The oxidation reaction results in the reaction of one mole of the dithiocarbamate with one mole of the amine to produce a new chemical compound.

The preferred class of chemical compounds is believed to possess the following type formula:

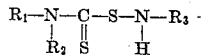

wherein $R_1$ and $R_2$ are alkyl radicals, or together constitute a cyclo-alkylene radical or a cyclo-dialkylene-oxy radical, and $R_3$ is an alkyl radical or a cyclo-alkyl radical. Thus, the new compounds are believed to be derivatives of sulfenamide ($HSNH_2$). Examples of alkyl radicals include methyl, ethyl, propyl, butyl, amyl, hexyl, heptyl, octyl, decyl, lauryl, benzyl, and similar radicals. Examples of cyclo-alkyl radicals include cyclohexyl and methyl-cyclohexyl radicals. Examples of cyclo-alkylene radicals include cyclopenta-methylene, methyl-cyclopentamethylene and cyclo-hexamethylene radicals. Examples of cyclo-di-alkylene-oxy radicals include cyclodiethylene-oxy and methyl-cyclodiethylene-oxy radicals.

The following specific examples are presented for illustrative purposes only, and are not to be construed as limiting the invention thereto.

Example 1

A sodium diethyldithiocarbamate solution was formed by gradually adding 10.4 grams of carbon disulfide to a solution of 10 grams of diethylamine and 5.5 grams of sodium hydroxide in 150 ml. of water. A solution of 11 grams of sodium hydroxide in 100 ml. of water and 67.8 grams of cyclohexylamine were then added to the dithiocarbamate solution, and the resulting mixture was diluted with water to a volume of about 500 ml. The cyclohexylamine was present in the ratio of 5 moles per mole of the dithiocarbamate, and the solution contained two moles of sodium hydroxide per mole of the dithiocarbamate. The mixture, so produced, was maintained at 20–25° C. and agitated during the gradual addition thereto of an aqueous iodine solution containing 34.8 grams of iodine and 34.8 grams of potassium iodide in a total of 250 ml. of solution. A white, finely divided, crystalline precipitate separated during the addition of the last portions of the iodine solution. This precipitate was separated by filtration, washed with water and dried. The product melted at 64–65° C. and weighed 21.5 grams, a yield of 64 per cent of N-cyclohexyl (diethylthiocarbamyl) sulfenamide, having the following formula:

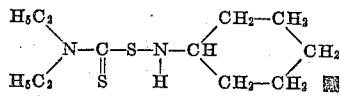

Analysis of the product showed that it contained 10.94 per cent of nitrogen and 26.90 per cent of sulfur, in comparison with percentages of 11.4 and 26.0, respectively, calculated from the above formula.

The oxidation reaction may be represented as follows:

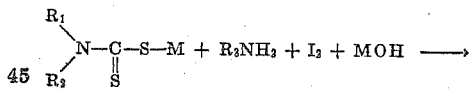

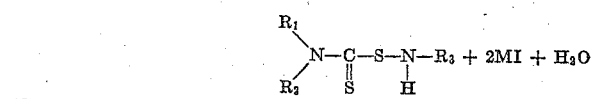

wherein M may be sodium or other alkali metal or alkaline earth metal, ammonium radical or the substituted ammonium radical formed from $R_3NH_2$ and water, in this example, the cyclohexylammonium radical. The oxidizing agent, iodine, may be substituted by chlorine or bromine, or by a hypohalite such as sodium hypochlorite.

It has been found advantageous to carry out the reaction between about 20 and 50° C. in order to avoid or minimize the oxidation of two molecules of the sodium dithiocarbamate derivative to form the thiuram disulfide, as lower temperatures favor the formation of the latter compound.

The sulfenamide derivative was tested as a vulcanization accelerator in the following rubber formula:

| Ingredients: | Parts by weight |
| --- | --- |
| Rubber (smoked sheets) | 100.00 |
| Sulfur | 3.00 |
| Stearic acid | 1.10 |
| Zinc oxide | 5.00 |
| Accelerator | 0.75 |

The rubber composition, so formulated was heated for 40 and 60 minutes at 240° F., and the following data were obtained:

| Accelerator | Modulus of Elasticity in lbs./in.² at elongation of 600% | | Tensile Strength in lbs./in.² at break | |
| --- | --- | --- | --- | --- |
| | 40 min. | 60 min. | 40 min. | 60 min. |
| N-Cyclohexyl (diethylthiocarbamyl) sulfenamide | 2,325 | 2,900 | 3,950 | 3,950 |

The above data show that the sulfenamide derivative is a rapid accelerator, imparting exceptionally high physical properties to the vulcanized rubber composition at the relatively low vulcanizing temperature of 240° F. The sulfenamide derivative was also tested to determine whether or not it possessed delayed-action characteristics by comparing it with a conventional ultra-accelerator, Butyl Zimate (zinc dibutyldithiocarbamate) in the following rubber formula:

| Ingredients: | Parts by weight |
| --- | --- |
| Rubber (smoked sheets) | 100.00 |
| Sulfur | 2.00 |
| Stearic acid | 0.50 |
| Zinc oxide | 2.00 |
| Accelerator | 0.25 |

The two rubber compositions were heated for 30 and 60 minutes at 230° F., and the following data were obtained:

| Accelerator | Modulus of Elasticity in lbs./in.² at elongation of 600% | | Tensile Strength in lbs./in.² at break | |
| --- | --- | --- | --- | --- |
| | 30 min. | 60 min. | 30 min. | 60 min. |
| Butyl Zimate | 350 | 750 | 2,075 | 1,675 |
| N-Cyclohexyl (diethylthiocarbamyl) sulfenamide | No cure | 400 | No cure | 1,525 |

These data show that the sulfenamide derivative possesses an appreciable delayed action, allowing its use, with safety, in rubber compositions to be processed under usual factory conditions, wherein temperatures as high as 230° F. are often reached.

*Example 2*

Additional sulfenamide derivatives were prepared according to the method of Example 1 by reacting cyclohexylamine with the dithiocarbamates from dimethylamine, dibutylamine and diamylamine, iodine being utilized as the oxidizing agent. Thus, N-cyclohexyl (dimethylthiocarbamyl) sulfenamide, a light yellow liquid was prepared in a yield of 40 per cent. This compound possesses the following formula:

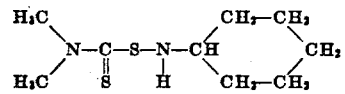

Likewise, from di-n-butylamine, there was produced N-cyclohexyl (di-n-butylthiocarbamyl) sulfenamide,

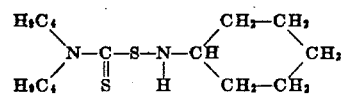

a light yellow liquid, in a yield of 50 per cent. From di-amylamine there resulted N-cyclohexyl (di-amylthiocarbamyl) sulfenamide.

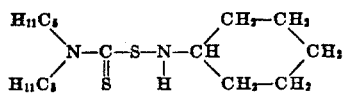

a light yellow liquid, in a yield of 78 per cent.

The above three sulfenamide derivatives were tested in the first rubber formula set out in Example 1. The dimethyl and dibutyl derivatives were tested at 10, 30 and 90 minutes at 230° F., and the following data were obtained:

| Accelerator | Modulus of Elasticity in lbs./in.² at elongation of 600% | | | Tensile Strength in lbs./in.² at break | | |
| --- | --- | --- | --- | --- | --- | --- |
| Cure in minutes | 10 | 30 | 90 | 10 | 30 | 90 |
| N-cyclohexyl (dimethylthiocarbamyl) sulfenamide | No cure | 1,325 | | No cure | 3,700 | ¹ 3,350 |
| N-cyclohexyl (dibutylthiocarbamyl) sulfenamide | No cure | 825 | 2,775 | No cure | 2,950 | 4,025 |

¹ Broke at 585%.

The above data show that the dimethyl and dibutyl derivatives are very effective delayed-action ultra-accelerators. The di-amyl derivative was tested at 40, 60 and 90 minutes at 240° F., and the following data were obtained:

| Accelerator | Modulus of Elasticity in lbs./in.² at elongation of 600% | | | Tensile Strength in lbs./in.² at break | | |
| --- | --- | --- | --- | --- | --- | --- |
| Cure in minutes | 40 | 60 | 90 | 40 | 60 | 90 |
| N-cyclohexyl (diamylthiocarbamyl sulfenamide | 1,575 | 1,825 | 2,300 | 3,750 | 3,650 | 3,700 |

*Example 3*

A solution of sodium cyclopentamethylenedithiocarbamate was prepared from piperidine, carbon disulfide and sodium hydroxide solution. Portions of this solution were separately condensed with cyclohexylamine, isopropylamine, secondary amylamine and tertiary amylamine, by the use of an iodine oxidizing solution, to form sulfenamide derivatives. These were, in order, N-cyclohexyl (cyclopentamethylenethiocarbamyl) sulfenamide,

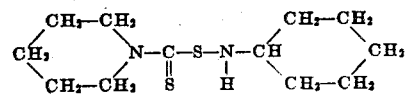

a white crystalline solid, melting at 74.5–75.5° C., and analyzing 25.14 per cent of sulfur, compared to 24.8 per cent calculated from the formula; N-isopropyl (cyclopentamethylenethiocarbamyl) sulfenamide,

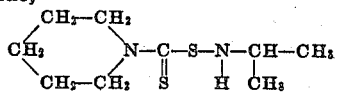

a white crystalline solid, melting at 50–52° C., N-sec. amyl (cyclopentamethylenethiocarbamyl) sulfenamide,

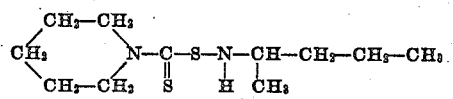

or N-methyl-n-propylcarbin (cyclopentamethylenethiocarbamyl) sulfenamide, a light yellow liquid; and N-tert. amyl (cyclopentamethylenethiocarbamyl) sulfenamide,

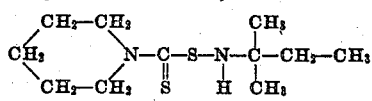

a white crystalline solid melting at 25–27° C., analyzing 26.37 per cent of sulfur, compared to 26.0 per cent calculated from the formula.

The above sulfenamide derivatives are all effective accelerators of the preferred class of compounds. As typical of these, the following data were obtained with a rubber composition containing the cyclohexyl derivative, in the first rubber formula set out in Example 1, and heated for 20 and 45 minutes at 270° F.:

| Accelerator | Modulus of Elasticity in lbs./in.² at elongation of 600% | | Tensile Strength in lbs./in.² at break | |
|---|---|---|---|---|
| Cure in minutes | 20 | 45 | 20 | 45 |
| N-cyclohexyl (cyclopentamethylenethiocarbamyl) sulfenamide | 675 | 2,350 | 2,750 | 3,850 |

*Example 4*

In accordance with the method of Example 1, sodium diethyldithiocarbamate was reacted with isopropylamine to produce a 43 per cent yield of N-isopropyl (di-ethylthiocarbamyl) sulfenamide,

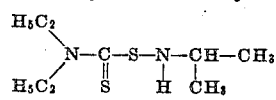

a light yellow liquid. Likewise, the same dithiocarbamate was reacted with sec. amylamine to form N-sec. amyl (diethylthiocarbamyl) sulfenamide,

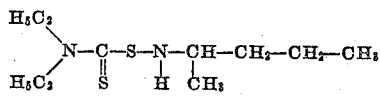

a light yellow liquid. In a similar manner, sodium dimethyldithiocarbamate was condensed with isopropylamine at 30–50° C. to form a 35 per cent yield of N-isopropyl (dimethylthiocarbamyl) sulfenamide,

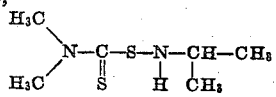

also a light yellow liquid. All of these sulfenamide derivatives are delayed-action ultra-accelerators comparable to previously discussed members of the preferred class.

*Example 5*

A solution was prepared containing 42.3 grams (0.23 mole) of sodium cyclodi-ethylene-oxydithiocarbamate (from morpholine, carbon disulfide and sodium hydroxide), 67 grams (1.13 moles) of isopropylamine and 9.1 grams (0.23 mole) of sodium hydroxide in a volume of 500 ml. An aqueous iodine solution containing 58 grams (0.23 mole) of iodine and 58 grams of potassium iodide in a volume of 400 ml. was dropped into the dithiocarbamate solution at room temperature (25° C.), with stirring. The product separated as a white crystalline solid, 15.8 grams (32 per cent yield), melting at 79–80° C. After one recrystallization from petroleum ether the product melted at 80–81° C. The compound so produced was N-isopropyl (cyclodi-ethylene-oxythiocarbamyl) sulfenamide, having the following formula:

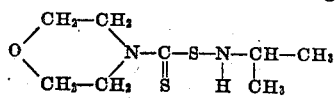

In a similar manner, the dithiocarbamate from morpholine was reacted with sec. butylamine to produce a 36 per cent yield of the light amber liquid product, N-sec. butyl (cyclodi-ethyleneoxythiocarbamyl) sulfenamide,

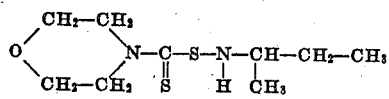

Likewise, the dithiocarbamate from morpholine was reacted with sec. amylamine to produce a 37 per cent yield of the amber liquid product, N-sec. amyl(cyclodi-ethylene-oxythiocarbamyl) sulfenamide,

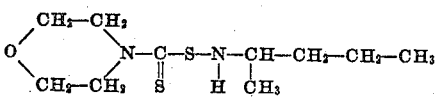

In addition, the same dithiocarbamate was reacted with cyclohexylamine to produce a 50 per cent yield of N-cyclohexyl (cyclodi-ethylene-oxythiocarbamyl) sulfenamide,

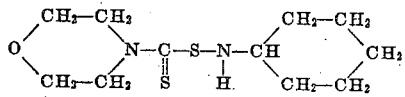

which after recrystallization from petroleum ether consisted of white crystals melting at 85–86° C.

The above sulfenamide derivatives from morpholine are all effective delayed-action accelerators of the preferred class of compounds. The following test data for the cyclohexyl derivative, in the first rubber formula set out in Example 1, is presented as typical of this group of compounds. The rubber composition was heated for 40, 60, 90 and 120 minutes at the low vulcanizing temperature of 240° F.

| | Modulus of Elasticity in lbs./in.² at elongation of 600% | | | | Tensile Strength in lbs./in.² at break | | | |
|---|---|---|---|---|---|---|---|---|
| Minutes | 40 | 60 | 90 | 120 | 40 | 60 | 90 | 120 |
| | No cure | 275 | 1,250 | 2,450 | No cure | 1,625 | 3,225 | 3,525 |

*Example 6*

Sodium di-octyldithiocarbamate was prepared from a commercial sample of di-octylamine, carbon disulfide and sodium hydroxide. To complete the reaction, the mixture was heated to 60°

C. and a slight excess of carbon disulfide was added. As the dithiocarbamate salt was partially insoluble in water, sufficient alcohol was added to bring it into solution. Four moles of isopropylamine were added per mole of the dithiocarbamate, and the resulting mixture was oxidized with iodine solution. The product at first precipitated as a liquid, and then solidified in the form of white pellets, having a melting point of 55-60° C. The preparation was obtained in a yield of 93 per cent of the theoretical yield for N-isopropyl (di-octylthiocarbamyl) sulfenamide,

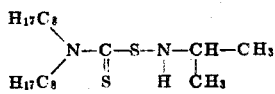

the new compound so prepared.

In a similar manner, sodium dilauryldithiocarbamate was formed from a commercial sample of dilaurylamine, carbon disulfide and sodium hydroxide. The dithiocarbamate was reacted in water solution with four molecular proportions of isopropylamine and iodine to produce a white, crystalline product melting at 150-165° C., in a yield of 15 per cent of the theoretical yield for N-isopropyl (dilaurylthiocarbamyl) sulfenamide,

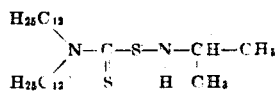

The above two isopropyl derivatives are effective delayed-action accelerators, comparable in action to previously considered members of the preferred class of compounds, although more strongly delayed-action than many of the preferred class.

The various members of the new class of chemical compounds are equally effective delayed-action vulcanization accelerators in rubber tread compounds, latex compounds or other conventional types of vulcanizable compounds of rubber, reclaimed rubber or synthetic rubber, and consistently produce very rapid-curing compositions, which in the vulcanized state possess unusually high modulus, tensile and abrasion-resisting properties. The various synthetic rubbers vulcanizable by heating with sulfur are herein considered equivalent to rubber, examples being butadiene polymers, isoprene polymers and various interpolymers of conjugated diolefins and vinyl compounds, such as Buna S (copolymer of butadiene and styrene) and Buna N (copolymer of butadiene and acrylonitrile). Although sulfur has hereinabove been mentioned as the preferred vulcanizing agent, other known vulcanizing agents susceptible to acceleration are contemplated.

The preferred class of sulfenamide derivatives may be prepared by other methods than those mentioned above, although the method herein of oxidizing a mixture of a dithiocarbamate and ammonia or an amine having a hydrogen atom attached to the nitrogen atom is preferred. However, the invention is not limited to chemical compounds prepared in accordance with any particular method, but includes the preferred class of compounds, however they may have been formed.

In addition to the above-enumerated desirable properties imparted by the new accelerators to rubber compositions, it has been found that the vulcanized compositions also are highly efficient, having low hysteresis characteristics. When compared to conventionally accelerated vulcanized rubber compositions, the new compositions are found to be unusually resistant to deterioration upon flexing or aging.

Conventional accelerator activators may be employed to an advantage with the new class of accelerators when extremely rapid vulcanization is desired, especially at low temperatures. Also, the new accelerators may be used in combination with other accelerators, such as a guanidine (e. g., diphenyl guanidine) or a conventional mercaptothiazole derivative (e. g., mercaptobenzothiazole or dibenzothiazyldisulfide) in order to produce rubber compositions having especially rapid or specific vulcanizing properties. The new accelerators may be employed in other proportions than the proportions shown, but will normally be utilized in the range of 0.1 to 10 parts per 100 parts of rubber.

Modification may be resorted to and obvious chemical equivalents substituted in the specific examples of the invention without departing from the spirit or scope of the invention as defined in the appended claims.

What is claimed is:

1. N-cyclohexyl (diethylthiocarbamyl) sulfenamide.
2. N - cyclohexyl (cyclopentamethylenethiocarbamyl) sulfenamide.
3. N - isopropyl (cyclodi - ethylene - oxythiocarbamyl) sulfenamide.
4. A substance having the formula $$\begin{array}{c} R_1 \\ \diagdown \\ \phantom{R_2}N-C-S-N-R_3 \\ \diagup \phantom{N}\| \phantom{S-N}| \\ R_2 \phantom{N-}S \phantom{-N-}H \end{array}$$

wherein $R_1$ and $R_2$ are selected from the group consisting of alkyl radicals, a cyclo-alkylene radical and a cyclodi-alkyleneoxy radical, and $R_3$ is selected from the group consisting of alkyl radicals and cyclo-alkyl radicals.

GEORGE E. P. SMITH, JR.
EDWARD L. CARR.

REFERENCES CITED

The following references are of record in the file of this patent:

UNITED STATES PATENTS

| Number | Name | Date |
|---|---|---|
| 2,045,888 | Tschunkur | June 30, 1936 |
| 2,191,657 | Harman | Feb. 27, 1940 |
| 2,268,467 | Ashworth | Dec. 30, 1941 |
| 2,271,834 | Carr | Feb. 3, 1942 |
| 2,318,482 | Hanslick | May 4, 1943 |
| 2,333,468 | Cooper | Nov. 2, 1943 |

FOREIGN PATENTS

| Number | Country | Date |
|---|---|---|
| 377,730 | Great Britain | July 25, 1932 |
| 852,118 | France | Jan. 24, 1940 |